(12) United States Patent
Baumann et al.

(10) Patent No.: US 7,686,722 B2
(45) Date of Patent: Mar. 30, 2010

(54) PLATE-LINK CHAIN FOR A CONTINUOUSLY VARIABLE TRANSMISSION

(75) Inventors: Markus Baumann, Karlsdorf-Neuthard (DE); Michael Pichura, Bühl (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 623 days.

(21) Appl. No.: 11/541,455

(22) Filed: Sep. 30, 2006

(65) Prior Publication Data

US 2007/0087881 A1 Apr. 19, 2007

Related U.S. Application Data

(60) Provisional application No. 60/817,173, filed on Jun. 28, 2006.

(30) Foreign Application Priority Data

Oct. 1, 2005 (DE) ........................ 10 2005 047 286

(51) Int. Cl.
*F16G 13/04* (2006.01)
*F16G 13/02* (2006.01)

(52) U.S. Cl. ........................ 474/245; 474/215; 474/227; 474/228; 474/229

(58) Field of Classification Search ................. 474/245, 474/215

See application file for complete search history.

(56) References Cited

U.S. PATENT DOCUMENTS

| 5,427,583 | A | 6/1995 | Wolf ........................... 474/206 |
| 6,135,908 | A | 10/2000 | Greiter ........................ 474/215 |
| 6,186,920 | B1 | 2/2001 | Reber .......................... 474/212 |
| 6,244,983 | B1 | 6/2001 | Matsuda ..................... 474/155 |
| 6,478,704 | B1 | 11/2002 | Greiter ........................ 474/229 |
| 2001/0023575 | A1 | 9/2001 | Linnenbrugger ............... 59/31 |
| 2004/0248682 | A1* | 12/2004 | Wagner et al. .............. 474/215 |
| 2005/0282674 | A1* | 12/2005 | Teubert et al. .............. 474/229 |

FOREIGN PATENT DOCUMENTS

| DE | 10 2004 007 100 A1 | 9/2004 |
| EP | 0 643 240 A1 | 3/1995 |

\* cited by examiner

*Primary Examiner*—Robert A Siconolfi
*Assistant Examiner*—San Aung
(74) *Attorney, Agent, or Firm*—Alfred J. Mangels

(57) ABSTRACT

A plate-link chain for a belt-driven conical-pulley transmission. The chain has a large number of link plates that are articulatingly connected with each other by rocker members, which link plates are positioned one behind the other and are offset from each other transversely relative to the longitudinal direction of the plate-link chain, and also partially overlap each other. The chain has a plurality of link plates of two different lengths in the longitudinal direction of the chain, with openings to receive the rocker members. The arrangement of the link plates in the longitudinal direction of the chain is such that a long link plate is followed by a short link plate.

4 Claims, 2 Drawing Sheets

PLATE-LINK CHAIN FOR A CONTINUOUSLY VARIABLE TRANSMISSION

BACKGROUND OF THE INVENTION

1. Field of the Invention

The present invention relates to a plate-link chain for a belt-driven conical-pulley transmission. The chain has a large number of link plates that are articulatingly connected with each other by rocker members. The link plates are positioned one behind the other transversely to the longitudinal direction of the plate-link chain, and are offset from each other in the longitudinal direction of the chain and partially overlap each other. The chain has a plurality of link plates of two different lengths in the longitudinal direction of the chain, with openings to receive the rocker members.

2. Description of the Related Art

A plate-link chain of the type described herein is made up of a large number of link plates and rocker members, the rocker members also being referred to as pegs or pins, and also being known as rocker hinges.

The link plates for forming such a plate-link chain are selected from two types of plate links, namely one known as a short plate link and one known as a long plate link.

The plate-link chain thus formed is used to transmit pulling force between two conical disk pairs of a belt-driven conical-pulley transmission. The transmission of force between the conical disk pairs and the plate-link chain is friction-based. That means, in other words, that ends of the rocker members between the conical disk pairs are subjected to high normal forces, in order to be able to build up the necessary frictional force, allowing for the coefficient of friction between the rocker member ends and the surfaces of the conical disk pairs.

As the rocker members enter the space between the conical disk pairs, the entry of the rocker members produces an entry impact, which is perceptible externally as noise level. To attenuate that phenomenon, plate-link chains with so-called random pitch have already become known, in which the pitch between the individual links of the plate-link chain is not constant over the length of the plate-link chain, but varies. That makes it possible to achieve a smoothing of the entry noise, so that the entry noise is no longer acoustically dominant in the foreground.

FIG. 1 of the drawings shows a known plate-link chain according to the so-called three-plate structure. Reference numeral 10 designates short link plates, viewed in the longitudinal direction of the plate-link chain, while reference numeral 22 designates long link plates, viewed in the longitudinal direction of the plate-link chain. In the schematic representation shown in FIG. 1, reference numeral 12 designates a pin; in reality it is the center of a pair of rocker members made up of two rocker members 14, 16, as shown in FIG. 2 of the drawings.

$T_K$ designates a short pitch, while $T_L$ designates a long pitch. The pitch T is the distance between the centers of two adjacent pins 12 or of two rocker member pairs 14, 16.

The plate-link chain shown in FIG. 1 of the drawings has become known on the basis of DE 10 2004 007 100. That known plate-link chain has already proven itself very well in use. Analyses of used plate-link chains of that type to determine their wear performance have shown that they are subject to width wear or edge wear in the region of the rocker members, which wear is higher the greater the effective pitch of the plate-link chain. The reason for that is that the greater the pitch, the greater is the normal force impressed on the ends of the rocker members. A higher normal force, in turn, causes greater deformation, and hence greater slippage between the rocker members and the conical disks. The wear performance described above as a function of the pitch length must therefore be seen as a consequence of the frictional power that is dissipated in the pin-disk contact.

The wear performance of the rocker members has an influence on the service life of the belt-driven conical-pulley transmission, so that reducing the end wear of the rocker members contributes to prolonging the service life of the transmission.

Starting from that point, an object of the present invention is to provide a plate-link chain that exhibits improved wear performance.

SUMMARY OF THE INVENTION

To achieve that object, the invention provides a plate-link chain for a belt-driven conical-pulley transmission, the chain having a large number of link plates that are articulatingly connected with each other by rocker members. The link plates are positioned one behind the other and are offset from each other transversely to the longitudinal direction of the plate-link chain and also partially overlap each other. The plate-link chain has a plurality of link plates of two different lengths in the longitudinal direction of the plate-link chain, with openings to receive the rocker members. The arrangement of the link plates in the longitudinal direction of the plate-link chain is such that a long link plate is followed by a short link plate.

The plate-link chain provided according to the invention is therefore made up of a large number of rocker members and link plates. To form the plate-link chain, two different types of link plates are provided, namely a short link plate, viewed in the longitudinal direction of the plate-link chain that is being formed, and a long link plate, also viewed in that longitudinal direction, so that they differ in terms of their longitudinal extent. Projections can also be provided on individual link plates so that the projections overlap link plates that are positioned in an offset arrangement, and thus prevent lateral displacement of the link plates, i.e. in the transverse direction of the plate-link chain.

The sequence of placement of the plate links to form the plate-link chain is such that a long plate link is always followed by a short plate link. Thus a short chain link must follow a long chain link, and the case of a long chain link being followed again by a long link is not possible. In the last-named case, a long effective pitch length would result.

The effective pitch length is the distance between two adjacent pairs of rocker members, i.e., interval T according to FIG. 1 of the drawings. FIG. 1 of the drawings shows a known plate-link chain, in which a long effective pitch $T_L$ is followed by a long effective pitch $T_L$. Such an arrangement is excluded in the plate-link chain according to the present invention.

Because of the formation sequence, where a short link plate follows a long link plate and a short link plate can be followed by another short link plate or else by a long link plate, the effective pitch length between two adjacent pairs of rocker members is reduced to a short effective pitch length and a so-called medium effective pitch length. The case of the short effective pitch length exists when a short link plate is followed again by a short link plate, and the case of the medium effective pitch length exists when a short link plate follows a long link plate or a long link plate follows a short link plate.

Thus that formation sequence again makes a so-called random pitch plate-link chain possible, with smoothing of the entry noise of the rocker members on the surfaces of the conical disks, but where the wear performance of the plate-link chain according to the invention is improved over the known plate-link chain. The reduction of the effective pitch length between two adjacent pairs of rocker members results in a reduction of the end wear on the rocker members, and thus to a prolongation of the service life of the plate-link chain according to the invention.

Thereby it is possible for a belt-driven conical-pulley transmission having a plate-link chain according to the invention to be employed in commercial vehicles that have significantly longer service times in a defined comparison period than passenger cars, for example, and hence can benefit from the advantage of an extended service life of the plate-link chain and thus of the belt-driven conical-pulley transmission. Since the background noise affecting the driver of such a commercial vehicle is already louder than that in the case of a passenger car, any worsening of the noise behavior of a belt-driven conical-pulley transmission having a plate-link chain according to the invention can be tolerated, since that drawback, which hardly manifests itself or does not manifest itself at all in the driving operation of the commercial vehicle, is more than compensated by the benefit of the longer service life of the transmission.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
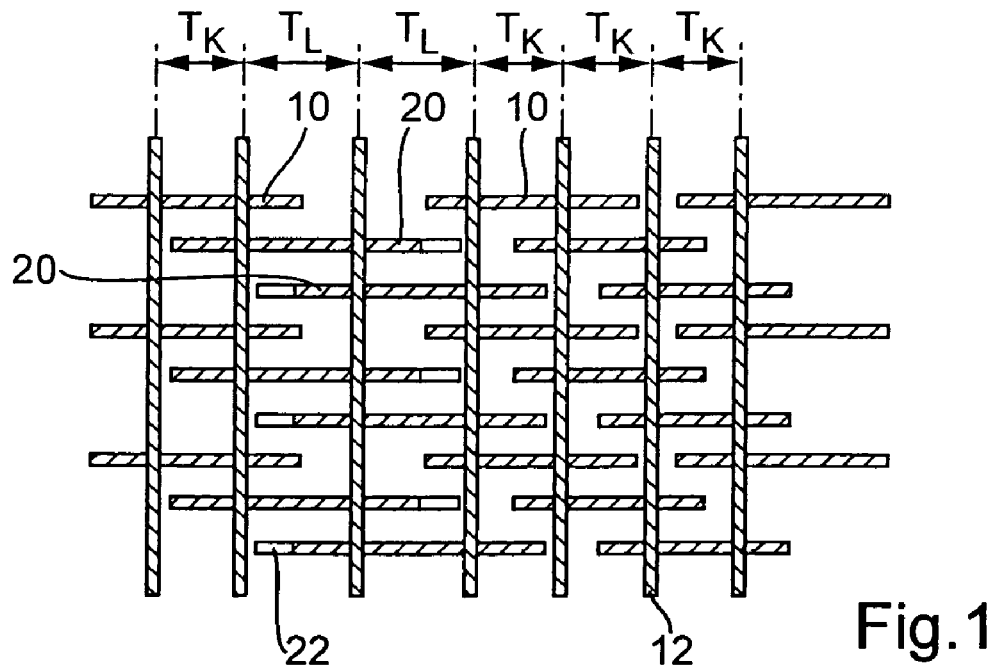
FIG. 1 is a top schematic view of a known plate-link chain using the three-plate structure.
Figure 2:
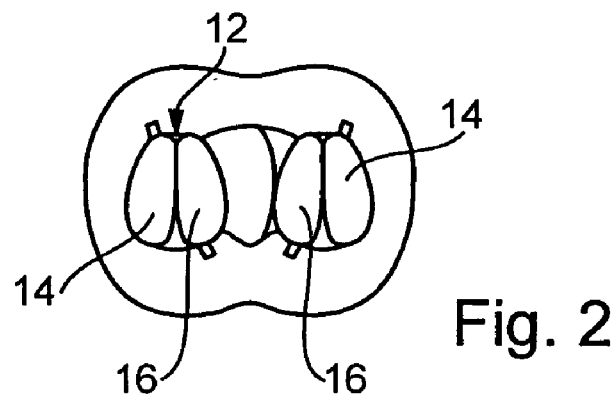
FIG. 2 is a side view of a link plate to explain individual concepts.
Figure 3:
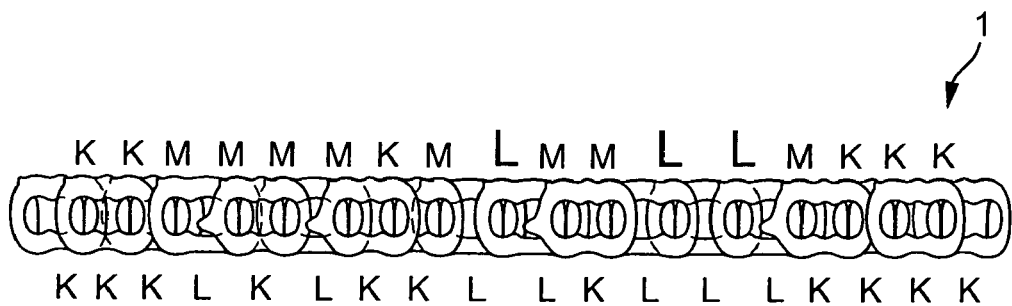
FIG. 3 is a side view of a segment of a known plate-link chain.

FIG. 3 of the drawings shows a side view of a segment of a known plate-link chain. K and L in the area beneath plate-link chain 1 designate the length of individual links of plate-link chain 1. K therefore designates a short link of plate-link chain 1, i.e., a link having short link plates, while L designates a long link of the plate-link chain. In the random pitch plate-link chain 1 according to FIG. 3, a long link L can follow another long link L, so that a large or long effective pitch between two adjacent pairs of rocker members results. The effective pitch is indicated in FIG. 3 of the drawing with K, M, and L above plate-link chain 1. K corresponds here to the effective pitch between two adjacent short chain links. If a short chain link is followed by a long chain link, then a pitch of medium length M occurs between the two adjacent pairs of rocker members, and if a long chain link is followed by another long chain link, then a long pitch L occurs between the two adjacent pairs of rocker members. It has been found that the end wear of the rocker members in the area of the long pitch L is greater than in the area of the medium-length pitch M and in the area of the short-length pitch K.

Figure 4:
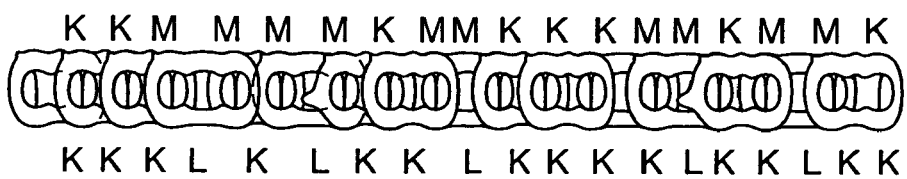
FIG. 4 is a side view of a segment of a plate-link chain according to an embodiment of the present invention.

In a direct comparison, FIG. 4 of the drawing shows the construction sequence of a plate-link chain 2 according to an embodiment of the present invention. As can be clearly seen, a chain link of long length L is always followed by a chain link of short length K, while a chain link of short length K can be followed by another chain link of short length K or by a chain link of long length L. The result of that formation sequence is that the effective pitch (labels K and M above plate-link chain 2) between two adjacent pairs of rocker members always corresponds to a short effective pitch K or a medium effective pitch M, but never to a long effective pitch L.

Figure 5:
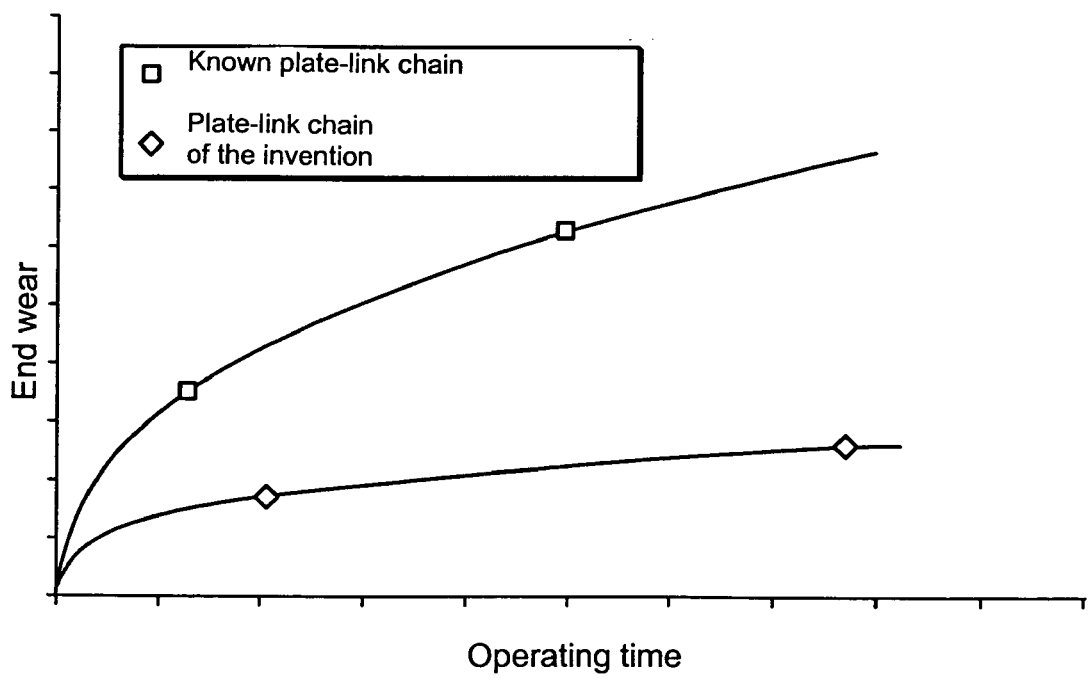
FIG. 5 is a graph comparing the rocker member end wear of a known plate-link chain and of a plate-link chain according to the present invention.

The thus-formed plate-link chain according to the present invention has the advantage of significantly reduced end wear of the rocker members of the plate-link chain. FIG. 5 of the drawings shows a graph of the rocker member end wear of the known plate-link chain 1, in comparison to that of plate-link chain 2 according to the present invention. As is plainly evident, viewed over the operating time the rocker member end wear for plate-link chain 2 according to the present invention is significantly lower than the end wear for plate-link chain 1, as it is known at present. Thus plate-link chain 2 according to the invention is particularly suitable for use in a belt-driven conical-pulley transmission which is intended for use in commercial vehicles.

With regard to features not explained in greater detail above, reference is made to the claims and the drawings.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A plate-link chain for a belt-driven conical-pulley transmission, said chain comprising: a plurality of link plates that are articulatingly connected with each other by rocker members, wherein link plates are positioned one behind another transversely to a longitudinal direction of the plate-link chain and are offset from each other in the longitudinal direction of the plate-link chain and partially overlap each other, the plate-link chain including a plurality of link plates having two different lengths in the longitudinal direction of the plate-link chain and having openings to receive the rocker members, wherein in a short link plate rocker members are spaced from each other in the longitudinal direction of the chain at a short pitch spacing and in a long link plate rocker members are spaced from each other in the longitudinal direction of the chain at a long pitch spacing, wherein link plates in the longitudinal direction of the chain are arranged such that each long link plate is immediately followed by a short link plate, so that pitch spacings in the longitudinal direction of the chain are one of a short pitch spacing and an intermediate pitch spacing that lies between the short pitch spacing and the long pitch spacing, and so that no long link plate immediately follows another long link plate.

2. A plate-link chain in accordance with claim 1, wherein link plates extending in the longitudinal direction of the plate-link chain are arranged such that a short link plate is followed by one of a short link plate and a long link plate.

3. A belt-driven conical-pulley transmission having a plate-link chain in accordance with claim 1.

4. A belt-driven conical-pulley transmission having a plate-link chain in accordance with claim 2.

* * * * *